(12) United States Patent
Lightner

(10) Patent No.: US 6,565,824 B1
(45) Date of Patent: May 20, 2003

(54) PRODUCTION OF CARBON MONOXIDE FROM CARBON DIOXIDE AND CARBON

(76) Inventor: Gene E. Lightner, 706 SW. 296, Federal Way, WA (US) 98023-3549

( * ) Notice: Subject to any disclaimer, the term of this patent is extended or adjusted under 35 U.S.C. 154(b) by 102 days.

(21) Appl. No.: 09/690,632

(22) Filed: Oct. 16, 2000

(51) Int. Cl.[7] ............................................... C01B 31/18
(52) U.S. Cl. ..................... 423/418.2; 252/373
(58) Field of Search ............................. 423/418.2, 246, 423/652, 655, 437.2; 252/373

(56) References Cited

U.S. PATENT DOCUMENTS

| | | | | |
|---|---|---|---|---|
| 4,251,227 A | * | 2/1981 | Othmer | 252/373 |
| 4,497,637 A | * | 2/1985 | Purdy et al. | 252/373 |
| 4,545,976 A | * | 10/1985 | Osman | 252/373 |
| 4,699,632 A | * | 10/1987 | Babu et al. | 252/373 |

OTHER PUBLICATIONS

Chemical Process Industries, 1968 no month, R.N. Shreve, pp. 126–128, 130–132, Second Edition, p. 136, p. 121.
Rogers Industrial Chemistry, 1942 no month, Anonymous, pp. 736–737, Sixth Edition vol. 1.
Chemical Engineers' Handbook, 1950 no month, John H. Perry, et. al., pp. 1579–1580.
Bioethanol Technology, Unknown no date, www.ott.doe.gov/biofuels/biothanol.htm., pp. 1–3.
Synthesis Gas Fermentations, Unknown no date, www.egr.msu.edu/biotech/synthesi.htm, pp. 1–2.
Biomass Gasification, Unknown no date, www.ctarm.hawaii.edu/biosystems/Gasifier/, pp. 1–4.

* cited by examiner

*Primary Examiner*—Stanley S. Silverman
*Assistant Examiner*—Edward M. Johnson

(57) ABSTRACT

A method is presented for production of carbon monoxide by reacting carbon dioxide and carbon to form carbon monoxide. Carbon is obtained from pyrolysis of carbonaceous solids. Following separating carbon monoxide from carbon, reacting to form carbon monoxide, the remaining mass contains inorganic and organic components. The mass containing inorganic and organic components is subjected to combustion by air to produce a flue gas and a residue containing inorganic components. The carbon monoxide, removed from the carbon, is reacted with steam to form a gaseous mixture of carbon dioxide, hydrogen and carbon monoxide which is a synthesis gas. A basic solution capable of combining with carbon dioxide is employed to remove carbon dioxide from a synthesis gas to provide synthesis gas substantially free of carbon dioxide.

25 Claims, 3 Drawing Sheets

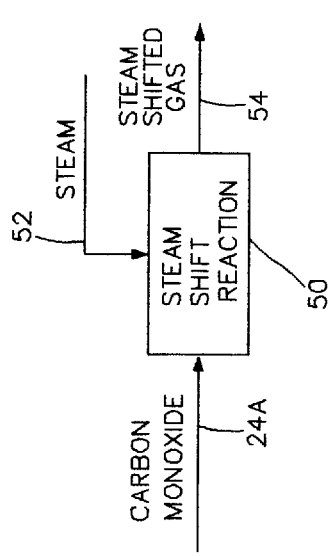
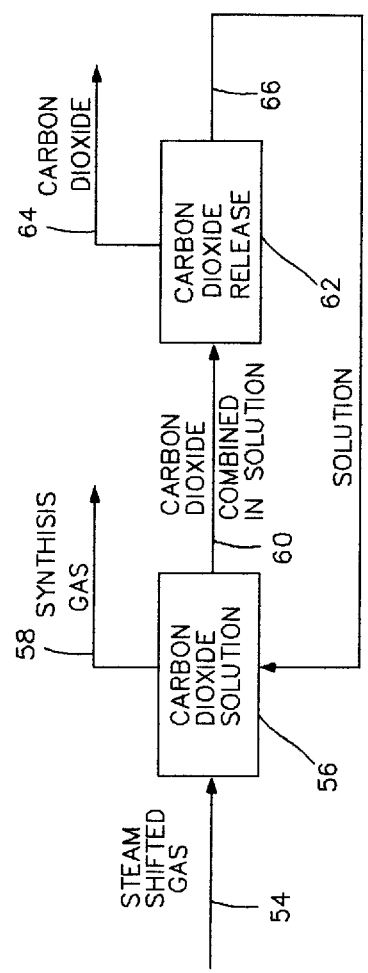
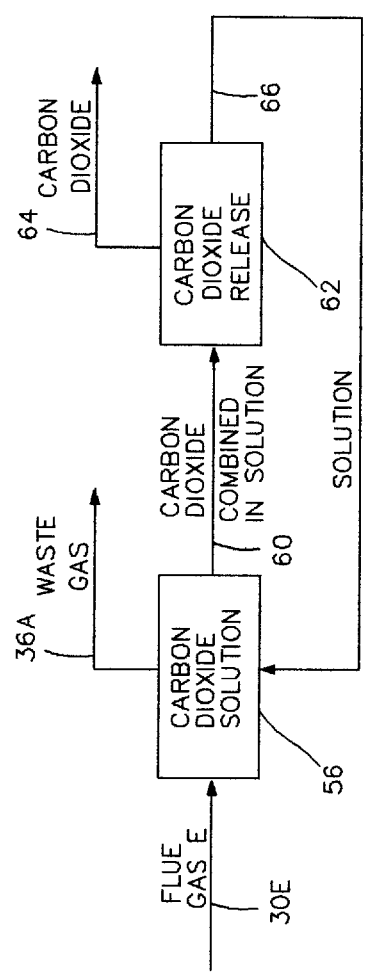

PRODUCTION OF CARBON MONOXIDE FROM CARBON DIOXIDE AND CARBON

BACKGROUND OF THE INVENTION

Pyrolysis of wood to produce charcoal has been accomplished throughout the world since ancient times. Pyrolysis of coal to manufacture coke has been carried out in modern times. Coal is formed from a biomass which has undergone decomposition and compacting. Coal (fossil fuel) deposits are found in almost every state in the union and are expected to provide plentiful supplies of coal for centuries to come. Both biomass and coal are carbonaceous solids that contain energy derived from the sun. There is an increasing interest in converting renewable biomass to usable products to avoid consumption of non-replaceable fossil fuels. Biomass is associated with non-fossil organic materials that contain fundamental energy derived from the sun. A biomass is often selected from the group consisting of wood, waste paper and municipal solid waste including an individual or a combination of these materials. Conversion of biomass to practical non-stationary fuels is desired. Present day interest in biomass is to provide an alternative fuel source to avoid dependence on unreliable imported petroleum crude oil for fuels.

Manufacture of water gas, as described in Chemical Engineers Handbook third edition, edited by John H Perry, pages 1579–1580, begins with coal or coke as a source of carbon transported to a steel shell about 3 to about 10 ft. diameter lined with insulation and fire brick. The coal or coke is dependent on oxygen in air for combustion to form incandescent carbon. As soon as the carbon bed obtains satisfactory temperature the air supply is shut off and steam is admitted to produce the desired water gas. The admitted steam rapidly reduces the carbon bed temperature. The steam flow is then discontinued and air flow is admitted to the steel shell to raise the carbon temperature to incandescence thus repeating the sequence. Accordingly water gas is produced. New developments for employment of low cost tonnage oxygen is being investigated for use in continuous water gas manufacture as reported by Perry, et. al.

A present day continuous process for biomass gasification is being developed at the University of Hawaii and is illustrated and explained by "Biomass Gasification" on the internet. The process employs oxygen and biomass to produce water gas converted by steam to manufacture synthesis gas. The synthesis gas is then transformed from a gas to form liquid methanol. "Bioethanol Technology", reported on the internet buy researchers at NREL, synthesis gas from biomass can be fermented by anaerobic bacteria to convert synthesis gas to form ethanol. Synthesis gas, containing carbon monoxide, is usually derived from petroleum materials contained in crude oil or from other non-replaceable fossil fuels.

It is therefore an object of this invention to obviate many of the limitations or disadvantages of the prior art.

A principal object of this invention is to produce carbon monoxide obtained from carbonaceous solids.

A distinct object of this invention is to employ carbon from pyrolysis of carbonaceous solids.

A further object of this invention is to create synthesis gas.

Another object of this invention is to supply thermal energy to a heat exchanger with flue gas to heat a mixture of carbon monoxide and carbon dioxide to provide energy to carbon.

Furthermore a fundamental object of this invention is to remove sensible heat from flue gas attained from combustion to generate steam.

Still another object of this invention is to make use of a flue gas to function as a dryer to remove moisture from carbonaceous solids and produce a supply of significantly moisture free carbonaceous solids for pyrolysis.

Yet another object of this invention is to provide a solution capable of combining with carbon dioxide.

An additional object of this invention is to provide carbon dioxide, separated, from a solution containing combined carbon dioxide. With the above and other objects in view, this invention relates to the novel features and alternatives and combinations presently described in the brief description of the invention.

THEORETICAL BACKGROUND OF THE INVENTION

A principle, applied in the present invention, employs carbon to react with carbon dioxide to form carbon monoxide. The chemical formula, $CO_2+C=2CO$ is provided in Chemical Process Industries, second edition, authored by R. N. Shreve, page 121. This reaction is endothermic and requires energy from an external source to maintain temperature of the carbon. Sensible heat from a heated mixture of carbon dioxide and carbon monoxide will supply energy to maintain temperature of the carbon to compensate for the energy required to form carbon monoxide by reaction of carbon dioxide. Notice that carbon monoxide in the mixture supplies sensible heat to carbon without participating in the reaction. Equilibrium of this reaction with carbon, at different temperatures, is presented in a table on pages 736 and 737 in Rogers' Industrial Chemistry, sixth edition, volume one.

Shifting a gas containing carbon monoxide is customarily achieved with water or steam to shift carbon monoxide to carbon dioxide and hydrogen. Steam is reacted with carbon monoxide to convert carbon monoxide to carbon dioxide and hydrogen, as described by Shreve, op. cit., page 136. Also water, implied by Shreve, (assumed to be in the form of steam) is reacted with carbon monoxide to shift carbon monoxide to carbon dioxide and form hydrogen, in the chemical formula, $H_2O+CO=CO_2+H_2$ presented by Shreve op. cit., page 121.

An illustration of a salt being employed to form a bicarbonate is described by Shreve, op. cit., on pages 126 and 128 in which sodium carbonate reacts with gaseous carbon dioxide and water to reversibly form water soluble sodium bicarbonate presented in the equation $Na_2CO_3+CO_2+H_2O \rightleftharpoons 2Na\ HCO_3$. The solution containing sodium bicarbonate is then heated to reverse the reaction and concentrated carbon dioxide is produced and a solution containing sodium carbonate to be recycled. A typical example of forming a bicarbonate from a salt reacting with gaseous carbon dioxide furnished by a flue gas is thus provided. Shreve, op. cit., pages 130–132. describes a method to absorb gaseous carbon dioxide in a basic aqueous solution of potassium carbonate or mono ethanolamine in which the absorbed carbon dioxide is removed from the aqueous solution to produce carbon dioxide as a gas. A basic solution capable of reacting with carbon dioxide is often selected from the group consisting of aqueous bases and aqueous salts including an individual or a combination of these aqueous solutions thereof.

BRIEF DESCRIPTION OF THE INVENTION

The present invention in its broadest aspect, establishes a method to produce carbon monoxide derived from carbon dioxide and carbon. A supply of carbon dioxide is advanced to carbon to react and form carbon monoxide and then separating the carbon monoxide from the carbon. Components remaining from forming carbon monoxide from carbon contain inorganic and organic components and are separated from the carbon. The separated components are subjected to combustion to form a flue gas and a residue containing inorganic components. Following separation from combustion, the residue is used to heat air for combustion. Combustion produces a flue gas to generate steam and a residue for disposition. Combustion is accomplished in a boiler provided with a heat exchanger, employing flue gas from combustion, for heating a mixture of carbon monoxide and carbon dioxide which is advanced to provide energy to carbon. The heated mixture reacts with the carbon to form carbon monoxide. The carbon monoxide, removed from the carbon, is reacted with steam to form a gaseous mixture of carbon dioxide, hydrogen and carbon monoxide which is a synthesis gas.

A basic solution capable of combining with carbon dioxide is employed to remove carbon dioxide from the gaseous mixture to provide a synthesis gas containing hydrogen and carbon monoxide substantially free of carbon dioxide and a separated solution containing combined carbon dioxide. The solution, containing combined carbon dioxide freed from the synthesis gas, is released from carbon dioxide to form gaseous carbon dioxide and a basic solution capable of combining with carbon dioxide. Pyrolysis, utilizing flue gas, is employed to provide a supply of carbon. Flue gas containing carbon dioxide is commingled with a basic solution capable of combining with carbon dioxide to form a solution containing combined carbon dioxide freed from the flue gas. The solution then releases gaseous carbon dioxide and forms a solution capable of combining with carbon dioxide.

Characteristics of the invention include:

Flue gas, derived from combustion, is employed to heat a mixture of carbon dioxide and carbon monoxide to maintain temperature of the carbon.

Thermal sensible heat from the flue gas is used to generate steam.

Carbonaceous solids are substantially dried by the flue gas to provide substantially dried carbonaceous solids subjected to pyrolysis.

Production of a synthesis gas substantially free of carbon dioxide.

BRIEF DESCRIPTION OF THE DRAWINGS

The features that are considered characteristic of this invention are set forth in the appended claims. This invention, however, both as to its origination and method of operations as well as additional advantages will best be understood from the following description when read in conjunction with the accompanying drawings in which:

FIG. 3 is a flow sheet denoting a method to react carbon monoxide with steam.

FIG. 4 is a flow sheet denoting a method to remove carbon dioxide from synthesis gas.

FIG. 5 is a flow sheet denoting a method to remove carbon dioxide from flue gas.

DETAILED DESCRIPTION OF THE PREFERRED EMBODIMENT

In the preferred embodiment of the present invention production of carbon derived from carbonaceous solids is supplied. Carbon, separated from pyrolysis of carbonaceous solids, is reacted with carbon dioxide to produce carbon monoxide.

Figure 1:
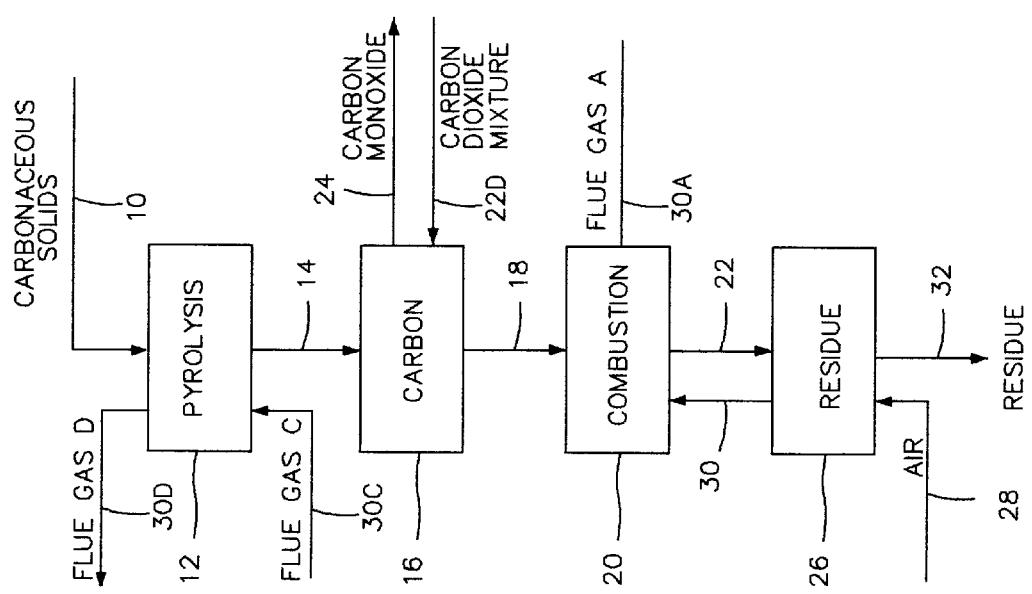
FIG. 1 is a flow sheet denoting the invention as set forth in the appended claims.

The flow diagram of FIG. 1 illustrates the general preferred embodiment of the present invention. In the diagram, rectangles represent stages, operations or functions of the present invention and not necessarily separate components. Arrows indicate direction of flow of material in the method. The method portrayed in FIG. 1 will take place from carbon, obtained from carbonaceous solids, maintained at a temperature of about 500 to about 1000 degrees Celsius.

Referring to FIG. 1, carbonaceous solids 10 and flue gas C 30C are conveyed to pyrolysis stage 12 to produce flue gas D 30D and carbon solids 14 which is conveyed to carbon stage 16 to react with carbon dioxide mixture 22D to form carbon monoxide 24. Separated inorganic and organic components remaining from forming carbon monoxide 18 are subjected to combustion 20 which produces flue gas A 30A and residue 22 which is then conveyed to residue stage 26 to heat air 30 supplied from ambient air 28 and produce residue 32 for disposition. Carbonaceous solids 10 are generally either coal or a biomass. Flue gas A 30A is essential to the method for various uses in addition to pyrolysis. The carbon dioxide mixture 22D containing carbon monoxide 24 is utilized to provide energy to carbon 16 to react in an endothermic reaction to form carbon monoxide 24. Temperature in the carbon stage 16 is controlled and maintained by sensible heat supplied from heated carbon dioxide mixture 22D to maintain a temperature of about 500 to 900 degrees Celsius. By continuously providing carbonaceous solids 10, the method is therefore operated in a continuous fashion. Carbonaceous solids 10 ordinarily consists of a biomass or coal.

Figure 2:
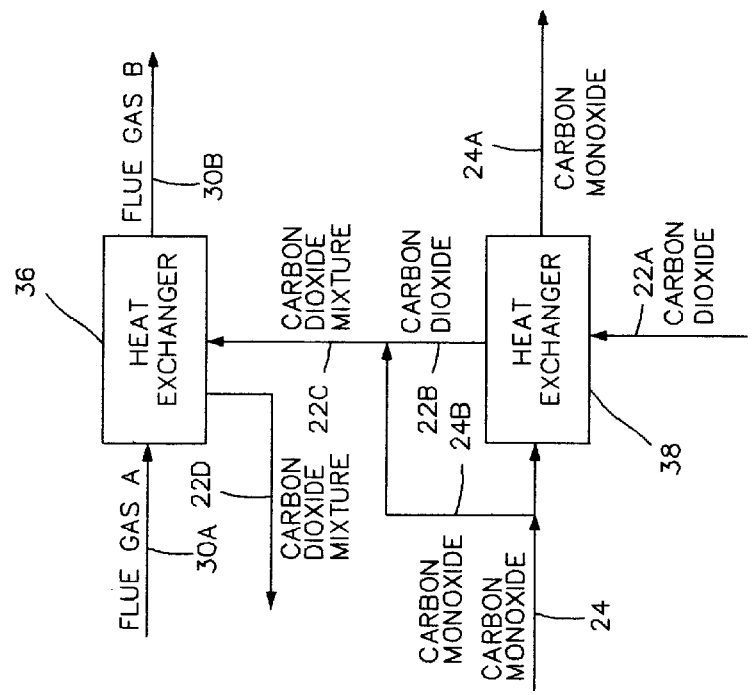
FIG. 2 is a flow sheet denoting a method to heat carbon dioxide.

Referring to FIG. 2, carbon monoxide 24 is split in two parts to provide carbon monoxide 24B which is combined with heated carbon dioxide 22B to be heated by heat exchanger 36 to provide heated carbon dioxide mixture 22D which is then conveyed to carbon stage 16. Split carbon monoxide 24 is transferred to heat exchanger 38 to heat carbon dioxide 22A to provide heated carbon dioxide 22B to supply heat exchanger 36. Heat exchanger 36 is supplied by flue gas A 30A, containing sensible heat energy, and produces flue gas B 30B of reduced sensible heat energy. Split carbon monoxide 24A is of substantially twice the volume as carbon dioxide 22A.

Referring to FIG. 3, carbon monoxide 24A is conveyed to steam shift reaction 50 to react with steam 52 to form steam shifted gas 54 containing hydrogen, carbon monoxide and carbon dioxide. The steam shift reaction stage 50 regularly contains a catalyst and produces a mole ratio of hydrogen to carbon monoxide of about two to one.

Referring to FIG. 4, steam shifted gas 54 containing carbon dioxide is commingled with solution 66 contained in carbon dioxide solution stage 56 wherein carbon dioxide establishes carbon dioxide combined in solution 60 and is separated from synthesis gas 58. Carbon dioxide combined in solution 60 is transferred to carbon dioxide release stage 62 and released to form gaseous carbon dioxide 64 and to form solution 66 which is recycled to carbon dioxide solution stage 56. Synthesis gas 58 is customarily pressurized to form methanol which utilizes a catalyst. Gaseous carbon dioxide 64 is customarily utilized to supply carbon dioxide 22A.

Referring to FIG. 5, flue gas E 30E containing carbon dioxide by commingling with solution 66 contained in carbon dioxide solution stage 56 wherein carbon dioxide establishes carbon dioxide combined in solution 60 and is separated from waste gas 36A. Carbon dioxide combined in solution 60 is transferred to carbon dioxide release stage 62 and released to form gaseous carbon dioxide 64 and to form solution 66 which is recycled to carbon dioxide solution stage 56. Gaseous carbon dioxide 64 is often utilized to supply supplementary carbon dioxide 22A.

Figure 6:
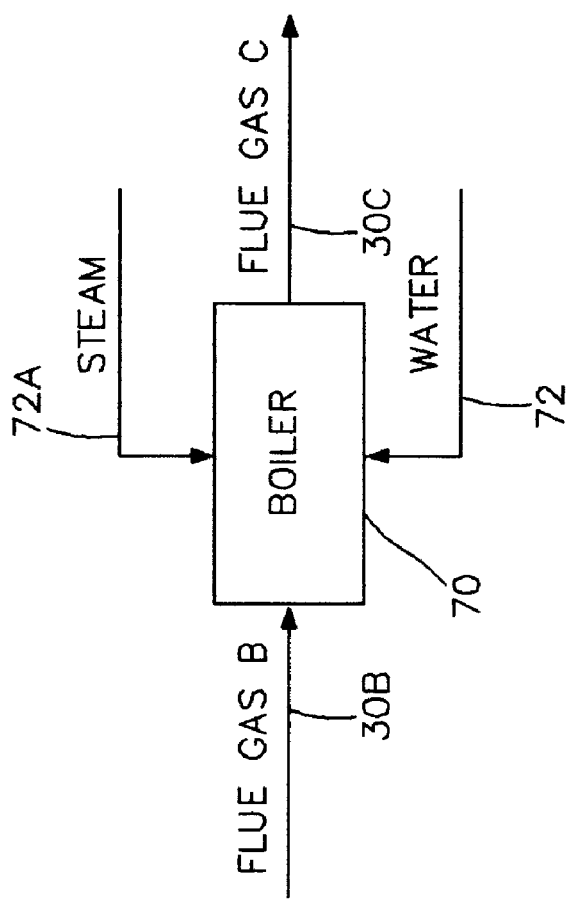
FIG. 6 is a flowsheet denoting a method to produce steam from water.

Referring to FIG. 6, flue gas B 30B is employed in boiler 70 to vaporize water 72 to form steam 72A. Boiler 70 is supplied by flue gas A 30B, containing sensible heat energy, and produces flue gas C 30C of reduced sensible heat energy. The steam boiler 70 including superheater tubes is configured to function as a heat exchanger 36 to produce carbon dioxide mixture 22D.

Figure 7:
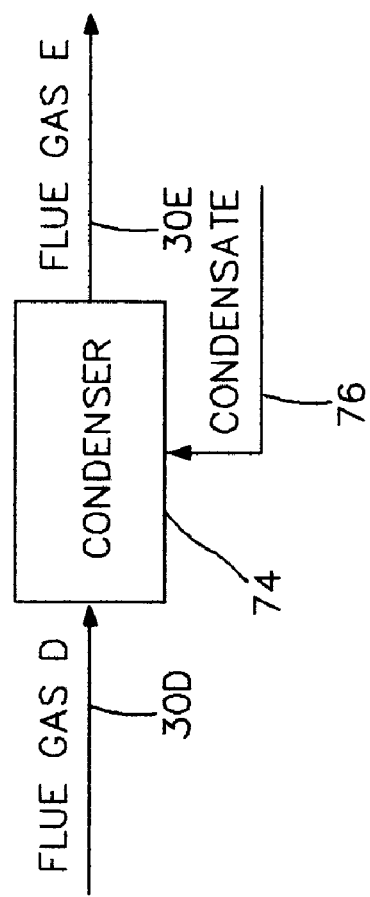
FIG. 7 is a flow sheet denoting a method to produce a condensate from a flue gas.

Referring to FIG. 7, flue gas D 30D is employed in condenser 74 to form condensate 76. Condenser 74 is supplied by flue gas D 30D, containing condensable vapors, and produces flue gas E 30E of reduced vapor content. Accordingly flue gas A 30A is employed in serial applications to reduce sensible heat of the flue gas in each application. Thus flue gas utilizes energy to supply heat energy in several operations and concluding by supplying flue gas of reduced energy and vapor content. The combustion stage 20 is customarily a furnace to encompasses the steam boiler 70 and the heat exchanger 36.

What is claimed is:

1. A method to produce carbon monoxide from carbon dioxide, consisting of:
   providing a supply of carbon from pyrolysis of carbonaceous solids, and
   providing a supply of said carbon dioxide, and
   mingling said carbon dioxide with said carbon to form carbon monoxide, and
   separating carbon monoxide from said carbon, and
   separating inorganic and organic components remaining from forming carbon monoxide from said carbon thereby producing carbon monoxide from carbon dioxide and carbon.

2. The method of claim 1 wherein the separated components are subjected to combustion by air to provide a flue gas and separation of a residue containing inorganic components.

3. The method of claim 2 wherein the separated residue containing inorganic components is utilized to heat air employed for combustion.

4. The method of claim 1 wherein said carbon is obtained from a biomass subjected to pyrolysis.

5. The method of claim 4 wherein the biomass is selected from the group consisting of wood, waste paper and municipal solid waste or combination thereof.

6. The method of claim 1 wherein the method is continuous.

7. The method of claim 1 wherein said carbon is obtained from coal subjected to pyrolysis.

8. The method of claim 1 wherein the separated components are subjected to combustion by air in a boiler to produce a flue gas to vaporize water and form steam.

9. The method of claim 8 further includes a heat exchanger within the boiler.

10. The method of claim 9 wherein the heat exchanger utilizes flue gas to heat gas containing said carbon dioxide.

11. The method of claim 1 wherein heretofore separated inorganic and organic components are subjected to combustion by air within a boiler to produce a flue gas to heat a mixture of carbon monoxide and carbon dioxide.

12. The method of claim 8 wherein the boiler further includes superheater tubes configured to function as a heat exchanger to heat gas containing said carbon dioxide.

13. The method of claim 1 wherein heretofore separated inorganic and organic components are subjected to combustion by air to produce a flue gas utilized used for pyrolysis.

14. The method of claim 1 further includes a basic solution capable of reacting with carbon dioxide which is selected from the group consisting of aqueous bases and aqueous salts or combination thereof.

15. The method of claim 1 wherein said carbon monoxide is reacted with steam to form hydrogen and carbon dioxide to produce a synthesis gas containing a mole ratio of hydrogen to carbon monoxide of about two to one.

16. The method of claim 15 wherein heretofore produced synthesis gas containing carbon dioxide is mingled with a basic solution capable of reacting with carbon dioxide to form a solution of reacted carbon dioxide and provide synthesis gas substantially free of carbon dioxide separated from the solution of reacted carbon dioxide.

17. The method of claim 16 wherein the synthesis gas, separated from the solution containing reacted carbon dioxide, is transformed to methanol.

18. The method of claim 16 wherein the separated solution of reacted carbon dioxide is heated to produce gaseous carbon dioxide and a basic solution capable of reacting with carbon dioxide.

19. The method of claim 18 wherein the gaseous carbon dioxide reacts with carbon to form carbon monoxide.

20. The method of claim 1 wherein said supply of carbon dioxide is combined with carbon monoxide.

21. The method of claim 1 wherein said carbon obtained from carbonaceous solids is maintained at a temperature of about 500 to about 1000 degrees Celsius.

22. The method of claim 1 further including a dryer function which utilizes flue gas to remove moisture from said carbonaceous solids to produce substantially moisture free carbonaceous solids and a flue gas of reduced sensible heat.

23. The method of claim 22 wherein substantially moisture free carbonaceous solids are subjected to pyrolysis.

24. The method of claim 1 wherein said produced carbon monoxide is of substantially twice the volume as said supply of carbon dioxide.

25. The method of claim 1 wherein said supply of carbon dioxide is pressurized.

* * * * *